April 9, 1929.  C. D. HARRISON ET AL  1,708,060
VALVE
Filed Nov. 8, 1927  2 Sheets-Sheet 1
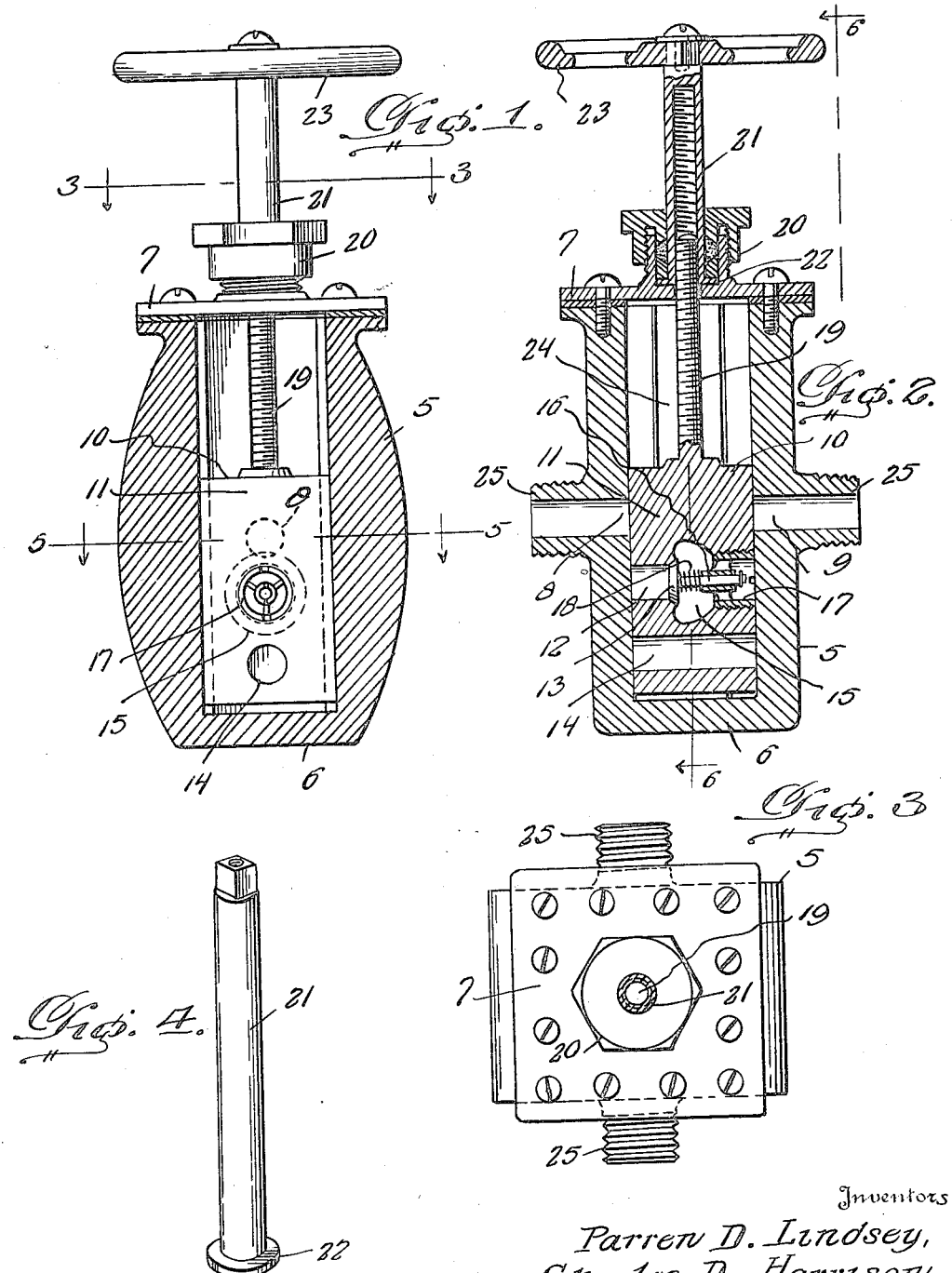
Inventors
Parren D. Lindsey,
Charles D. Harrison,
By J. Stanley Burch
Attorney

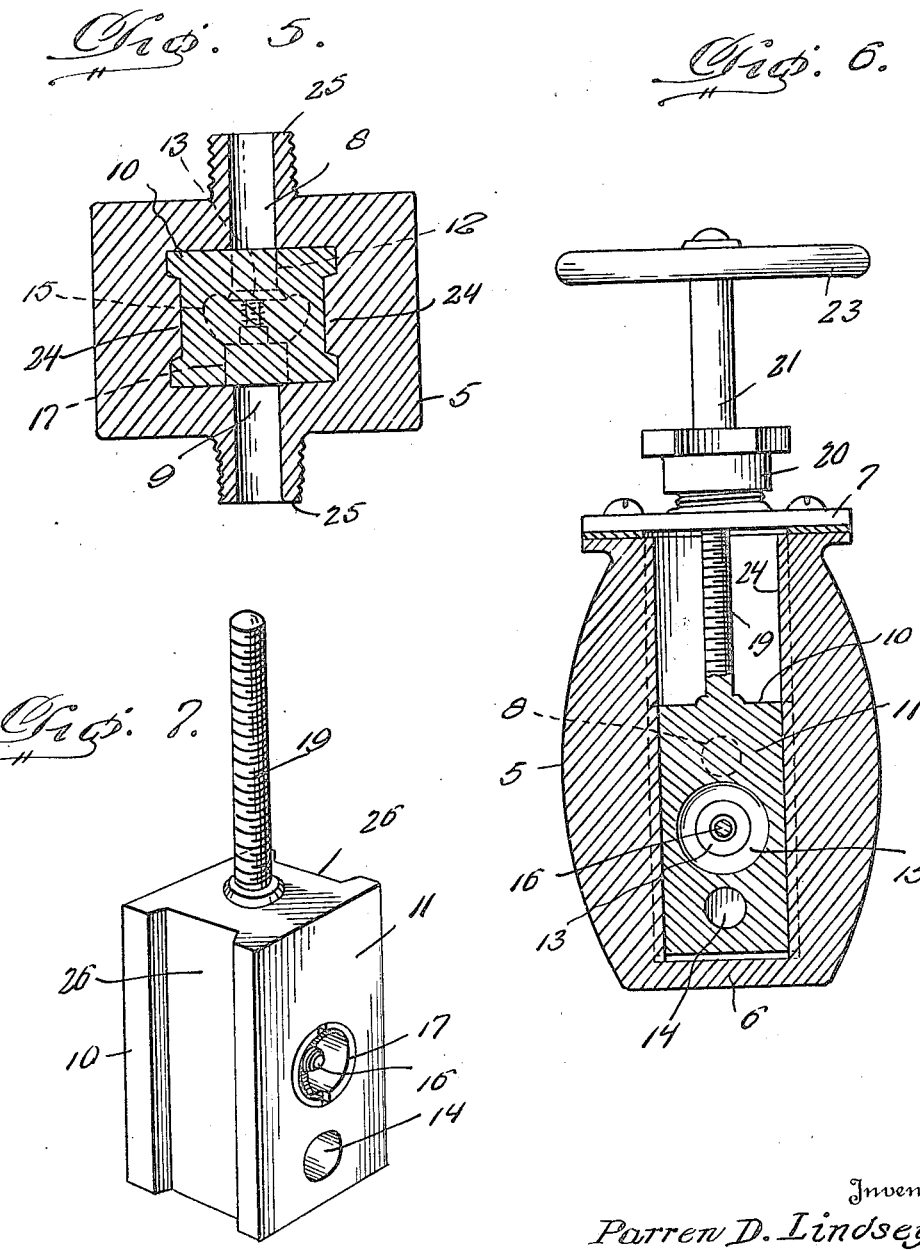

Patented Apr. 9, 1929.                              1,708,060

UNITED STATES PATENT OFFICE.

CHARLES D. HARRISON AND PARREN D. LINDSEY, OF HOMINY, OKLAHOMA.

VALVE.

Application filed November 8, 1927.  Serial No. 231,839.

This invention relates to valves, and particularly to a combined gate shut-off and check valve adapted to be used to advantage in oil lines, although capable of other uses.

The primary object of the present invention is to provide a valve of the above kind including a manually adjustable sliding gate member having check-valve controlled and open passages therethrough adapted to be selectively registered with opposed inlet and outlet ports of the valve casing upon adjustment of the gate member, to respectively permit fluid to pass through the casing in one direction while preventing return of the fluid therethrough or to permit such return flow of the fluid, the gate member further having an imperforate portion movable into position between the ports of the valve casing upon a further adjustment of said gate member to positively prevent flow of fluid through the casing in either direction.

In oil lines where oil is pumped from one level to a higher level, it is the common practice to use check valves to permit upflow of the oil while preventing return flow thereof, and to employ separate shut-off valves to positively prevent flow in either direction in an emergency and for other reasons. The use of a large number of valves of both kinds in a line obviously involves considerable expense, and in order to permit return flow of the oil the check valves must be removed at a great cost and expenditure of time. The present invention, therefore, aims to provide a valve which combines all of the functions and advantages of both a check valve and a shut-off valve so as to overcome the above-named disadvantages of separate check and shut-off valves.

A further object is to provide a valve of the above kind which is simple and durable in construction and extremely efficient in operation.

The invention consists in the novel form, combination and arrangement of parts hereinafter more fully described, shown in the accompanying drawings and claimed.

In the drawings:

Figure 1 is a view, partly in elevation and partly in vertical transverse section, of a valve embodying the present invention.

Figure 2 is a central vertical longitudinal section thereof.

Figure 3 is a horizontal section on line 3—3 of Figure 1.

Figure 4 is a perspective view of the adjusting spindle for the gate member.

Figure 5 is a horizontal section on line 5—5 of Figure 1.

Figure 6 is a section on line 6—6 of Figure 2, and

Figure 7 is an enlarged perspective view of the gate member with its threaded stem.

Referring more in detail to the drawings, the valve includes a casing 5 having a vertical bore of substantially rectangular cross section closed at the bottom by an integral wall 6 and at the top by means of a removable cover plate 7, the casing further having opposed inlet and outlet ports 8 and 9 in the transverse walls thereof intermediate the top and bottom of the casing.

Vertically slidable and fitted in the bore of the casing 5 is a gate member 10 having an upper imperforate portion 11, an intermediate passage 12 controlled by a check valve 13 and a lower open passage 14. The gate member 10 is vertically adjustable to selectively register the desired passage 12 or 14 with the ports 8 and 9 or to move the imperforate portion 11 between said ports as shown. When the gate member is in the latter position, the flow of fluid through the casing is positively prevented in either direction, and when the passage 12 is registered with ports 8 and 9, the fluid may flow freely through the casing in one direction although being prevented from returning or flowing therethrough in the opposite direction by check valve 13. On the other hand, when passage 14 is registered with ports 8 and 9, the return flow of the fluid is freely permitted.

As shown, the passage 12 has an enlarged intermediate portion 15 formed at its inlet side with a seat for valve 13, the latter being of the reciprocating type, having a stem 16 slidably guided in a central tubular guide of a tubular cage 17 threaded into the outlet end of passage 12, and yieldingly seated by a spring 18. The passage portion 15 obviously permits free flow of the fluid around and past valve 13 when the latter is unseated.

For the purpose of manually adjusting the gate member 10 to the desired position, the latter is provided with a rigid threaded stem 19 which projects upwardly into a central stuffing box 20 provided upon the top of cover plate 7, and which has threaded engagement in a hollow internally threaded adjusting spindle 21 whose lower end is swiveled in said stuffing box and surrounded by the packing of the latter to prevent leakage. The spindle 21 has a bottom flange 22 confined but freely rotatable in the stuffing box below the packing elements of the latter, as shown clearly in Figure 2. A hand wheel 23 may be provided on the upper end of the spindle 21 for facilitating manual turning thereof and it will be readily seen that by rotating said spindle the stem 19 will be caused to thread into or out of the spindle and thereby effect the desired raising or lowering of the gate member. It will be apparent that other means may be used, however, for adjusting the gate member.

The gate member is preferably provided with vertical side grooves 26 in which vertical ribs 24 on the sides of casing 5 fit, for most effectively guiding said gate member in its sliding movements with a minimum danger of binding or excessive friction.

Minor changes may be made without departing from the spirit and scope of the invention as claimed.

The casing 5 may have suitable means such as nipples 25 for enabling the valve to be properly connected to adjacent ends of adjacent pipe sections.

What we claim as new is:

1. A combined gate shut-off and check valve, comprising a casing having opposed inlet and outlet ports, a gate member slidable transversely of the casing and having an imperforate portion and a check valve controlled passage and an open passage selectively movable into position between the ports upon slidably adjusting said gate member, and manually operable means to adjust said gate member, said gate member adjusting means embodying a threaded stem rigid with the gate member and a hollow internally threaded spindle swiveled at one end on the casing and within which the stem has threaded engagement.

2. A combined gate shut-off and check valve, comprising a casing having opposed inlet and outlet ports, a gate member slidable transversely of the casing and having an imperforate portion and a check valve controlled passage and an open passage selectively movable into position between the ports upon slidably adjusting said gate member, manually operable means to adjust said gate member, said gate member adjusting means embodying a threaded stem rigid with the gate member, and a hollow internally threaded spindle swiveled at one end on the casing and within which the stem has threaded engagement, and a stuffing box on the casing in which the swiveled end of the spindle is confined.

3. A combined gate shut-off valve and check valve, comprising a casing having opposed inlet and outlet ports, a gate member slidable transversely of the casing and having an imperforate portion and a check valve controlled passage and an open passage selectively movable into position between the ports upon slidably adjusting said gate member, manually operable means to adjust said gate member, said check-valve controlled passage having an enlarged intermediate portion formed with a valve seat at its inlet side, the check valve having a stem and engageable with said seat, and a cage threaded in the outlet end of the last named passage and having a guide slidably receiving said stem.

In testimony whereof we affix our signatures.

CHARLES D. HARRISON.
PARREN D. LINDSEY.